Oct. 6, 1959 O. C. HALL 2,907,879

PHASE SELECTOR

Filed Feb. 17, 1956

INVENTOR.
ORVILLE C. HALL
BY George Sipkin
George E. Pearson
ATTORNEYS

United States Patent Office 2,907,879

Patented Oct. 6, 1959

2,907,879

PHASE SELECTOR

Orville C. Hall, Baltimore, Md., assignor, by mesne assignments, to the United States of America as represented by the Secretary of the Navy Application February 17, 1956, Serial No. 566,315

3 Claims. (Cl. 250—27)

This invention relates to phase selectors and more particularly to circuitry for providing a signal of either of two opposite phases and of varying amplitude.

According to the present invention, a first input signal is applied with equal amplitudes but opposite phase to the control grids of a pair of electron discharge tubes so balanced as to provide equal and oppositely phased outputs in response to the input signal. A second input or keying signal is applied to the control grid of one tube to vary the gain thereof and, through a feedback network, to vary the gain of the second tube in the opposite sense whereby the amplitude difference between the two output signals varies with the amplitude of the keying input and the polarity of the latter determines which of the two oppositely phased output signals is greater. The two output signals may be combined by either parallel or push pull operation of the tube plates. With parallel operation either of two phases is selected in accordance with the keying polarity and, in both instances, the output amplitude follows the keying amplitude. The invention is readily adapted to use in push pull reactance modulation or timing from opposite phase input signals.

It is an object of this invention to provide a signal having one of two selected phases.

A further object of this invention is to control both phase and amplitude of a signal in accordance with an information signal.

Still another object of this invention is to cause the phase of one signal to be dependent upon the polarity of a second signal.

A further object of this invention is the selection of a signal having a phase controlled by a second signal and having an amplitude dependent upon the amplitude of the second signal.

Other objects and many of the attendant advantages of this invention will be readily appreciated as the same becomes better understood by reference to the following detailed description when considered in connection with the accompanying drawings wherein.

Figure 1:
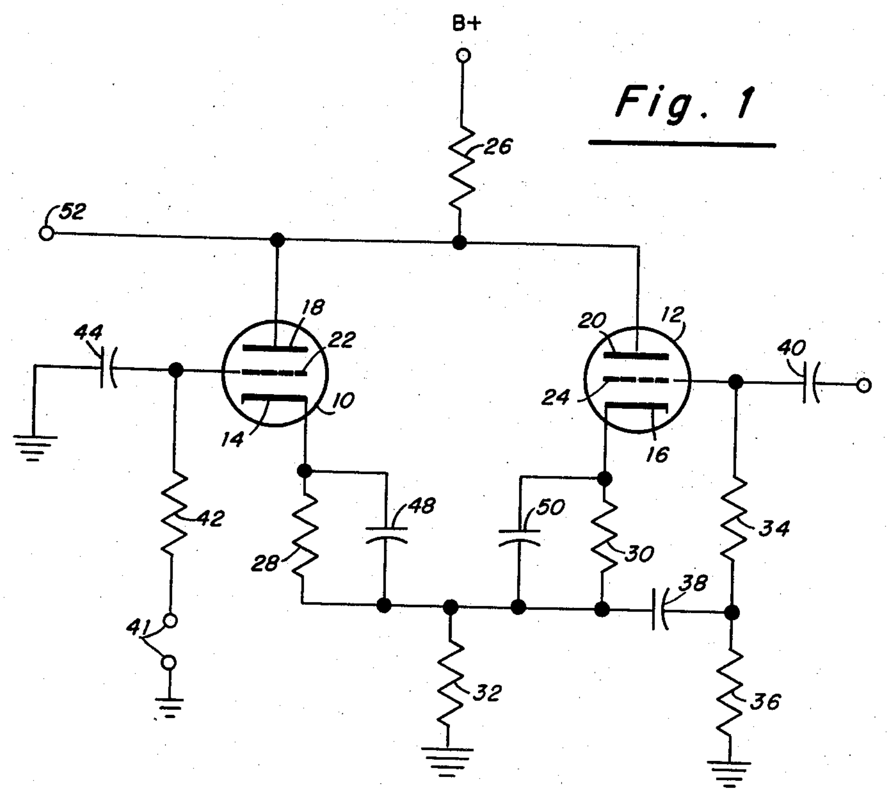
Fig. 1 is a schematic diagram of a preferred circuit of this invention.

A pair of electron discharge tubes 10, 12, each having at least a cathode 14, 16, plate 18, 20, and control grid 22, 24, have the plates thereof connected to a source of positive potential B+ through a common resistor 26 while the respective cathodes are connected to a fixed lower potential, which may be ground as shown, by resistors 28, 30 respectively, and common resistor 32. Grid 24 is grounded through resistors 34, 36 which are connected at the junction thereof to resistor 32 by means of capacitor 38 as shown. An A.-C. input signal $e_{in}$ is applied through capacitor 40 while a second input or keying signal of varying polarity is applied at terminals 41 via resistor 42 to grid 22 which is grounded through capacitor 44. Self bias by pass capacitors 48, 50 are connected across resistors 28 and 30 respectively.

An input signal $e_{in}$, which may be of radio frequency, applied via capacitor 40 is divided equally across resistors 32, 34 which are of equal value. Capacitor 38 is of a size to provide D.-C. blocking and offers a small reactance at the input frequency. Resistor 36 is large as compared with resistor 32 or 34. This method of applying the input signal causes a voltage of one half $e_{in}$ to be applied across resistor 34 from grid to cathode of tube 12 and an equal voltage to be applied across resistor 32 from cathode to grid of tube 10. The grid of the latter is grounded to input frequency by capacitor 44. Thus equal and opposite signals are applied to the two grids. The tubes and associated circuitry are so balanced that the gains of the two tubes are equal. The output voltage components $e_{10}$ and $e_{12}$ produced by tubes 10 and 12 respectively are therefore equal in amplitude but have zero and 180° phase, respectively, relative to $e_{in}$. If the plates 18, 20 be operated in parallel, as shown, the net A.-C. output signal at terminal 52 is zero.

Figure 2:
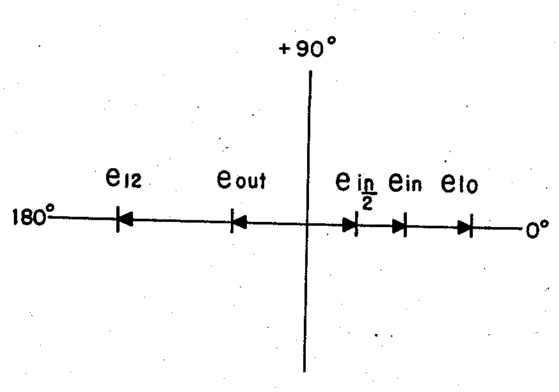
Fig. 2 illustrates the vector relation of signals of the circuit of Fig. 1.

A keying signal, such as an information audio signal of varying polarity, is applied at terminals 41 to control the phase and amplitude of the output signal $e_{out}$ at terminal 52. A keying signal of one polarity will produce a variation in the gain of tube 10 which is manifested as an opposite variation in the gain of tube 12 by means of the feedback network comprising the common components in the two plate circuits. Thus, when the keying signal is of a polarity which effects a decrease in amplitude of $e_{10}$ the amplitude of $e_{12}$ is increased, as shown in Fig. 2, whereby there is produced a net output $e_{out}$ which has the phase of the greater component $e_{12}$ and has an amplitude equal to the difference in amplitudes of $e_{10}$ and $e_{12}$. This amplitude difference, and of course the output amplitude or amplitude envelope of the radio frequency output, varies in accordance with the absolute amplitude of the keying signal. Conversely, when the keying signal is of the other polarity the amplitude of $e_{10}$ is increased and the amplitude of $e_{12}$ is decreased to produce a net output having the phase of $e_{10}$ but still varying in amplitude in accordance with the absolute amplitude of the keying signal.

The outputs of the two tubes are truly push-pull due to the method of injecting the input voltage across the voltage divider formed by resistors 32, 34. The cathodes are operated with self bias to avoid signal distortion.

If a push-pull output (two oppositely phased signals) is desired the plates may be operated push-pull by, for example, inserting separate resistors in each plate circuit, between resistor 26 and plates 18 and 20 respectively. With such an arrangement a combined output signal produced by adding the two outputs in phase can be varied in amplitude in accordance with the keying signal amplitude.

Obviously many modifications and variations of the present invention are possible in the light of the above teachings. It is therefore to be understood that within the scope of the appended claims the invention may be practiced otherwise than as specifically described.

What is claimed is:

1. A circuit arrangement comprising a pair of electron tubes each having at least a plate, cathode and control grid, a common load resistor coupling said plates to a source of high potential, means including a common cathode resistor coupling said cathodes to a source of low potential, first and second series connected resistors connecting one of said grids to said source of low potential, a capacitor connected between the junction of said first and second resistors and the cathode coupled end of said common cathode resistor, means for coupling the other of said grids to said source of low potential, means for applying a fluctuating signal to said one grid through said first resistor and said common cathode resistor, and means for applying a keying signal of varying polarity to said other grid.

2. The circuit arrangement of claim 1 wherein said common cathode resistor and that one of said series connected resistors which is connected to said one grid are of equal value.

3. A circuit arrangement comprising first and second electron tubes each having at least a cathode, a plate, and a control grid, first means for simultaneously applying signals directly to the control grid of said first tube and the cathode of said second tube to control the output of said tubes, and said first mentioned means includes a pair of equal resistors respectively connected to affect the grid circuits of said tubes, and means for feeding a single input signal through said resistors, and means for applying a keying signal solely to the control grid of said second tube for simultaneously effecting mutually opposite gain variations in said tubes.

References Cited in the file of this patent

UNITED STATES PATENTS

| | | |
|---|---|---|
| 2,380,947 | Crosby | Aug. 7, 1945 |
| 2,523,115 | Hersh et al. | Sept. 19, 1950 |
| 2,709,746 | Page | May 31, 1955 |
| 2,757,284 | Hutchinson et al. | July 31, 1956 |
| 2,760,062 | Hobbs | Aug. 21, 1956 |
| 2,783,436 | Gray et al. | Feb. 26, 1957 |